United States Patent
Hein et al.

(10) Patent No.: US 6,613,438 B1
(45) Date of Patent: Sep. 2, 2003

(54) SINGLE COMPONENT ADHESIVE WITH AN ADAPTABLE OPEN JOINT TIME

(75) Inventors: Peter Hein, Ruethnick (DE); Winfried Plundrich, Germering (DE); Ralf Wilcke, Berlin (DE); Ernst Wipfelder, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/890,146

(22) PCT Filed: Jan. 20, 2000

(86) PCT No.: PCT/DE00/00171

§ 371 (c)(1),
(2), (4) Date: Jul. 26, 2001

(87) PCT Pub. No.: WO00/44807

PCT Pub. Date: Aug. 3, 2000

(30) Foreign Application Priority Data

Jan. 28, 1999 (DE) .......................................... 199 03 354

(51) Int. Cl.[7] .......................... B32B 27/38; B32B 9/04; C08L 83/00; B29C 65/76; C09J 163/00
(52) U.S. Cl. ...................... 428/414; 428/413; 428/447; 428/448; 525/524; 525/525; 525/474; 525/476; 523/427; 523/433; 156/272.2; 156/304.1; 156/304.3; 156/304.6; 156/329; 156/330; 156/331.1
(58) Field of Search ................................ 523/427, 433; 525/524, 525, 474, 476; 428/413, 414, 416, 418, 447, 448, 450; 156/330, 331.1, 329, 304.1, 304.3, 304.6, 272.2; 524/860

(56) References Cited

U.S. PATENT DOCUMENTS 6,245,828 B1 * 6/2001 Weinmann et al. ...... 433/228.1

FOREIGN PATENT DOCUMENTS

| DE | 43 40 949 A1 | 12/1993 |
| DE | 195 38 468 A1 | 10/1995 |
| WO | 98/33645 | 8/1998 |

OTHER PUBLICATIONS

Patent Abstracts of Japan, vol. 1998, No. 14, 31 Dez.,1998 & JP 10 237 156A.

* cited by examiner

Primary Examiner—Robert Dawson
Assistant Examiner—Michael J Feely
(74) Attorney, Agent, or Firm—Morrison & Foerster LLP

(57) ABSTRACT

The invention relates to a one-component epoxy resin adhesive which is elasticated with silicone rubber and whose open joint time is adaptable to whichever production process it is being used in by the concentration of UV initiator and/or the duration and/or intensity of UV activation and which is therefore particularly suitable for automatable manufacturing processes, since the workpieces after initial fixing require no additional mounts even during thermal aftercuring. This adhesive is preferentially suitable for the extensive adhesive bonding of permanent magnets, such as in the assembly of a permasyn motor, for example.

10 Claims, No Drawings

SINGLE COMPONENT ADHESIVE WITH AN ADAPTABLE OPEN JOINT TIME

CLAIM FOR PRIORITY

This application claims priority to International Application No. PCT/DE00/00171 which was published in the German language on Aug. 3, 2000.

TECHNICAL FIELD OF THE INVENTION

The invention relates to a one-component epoxy resin adhesive, and in particular, to a one-component epoxy resin adhesive which is elasticated with silicone rubber and whose open joint time can be adapted.

BACKGROUND OF THE INVENTION

In many sectors of industry, workpieces are already fastened or joined exclusively by adhesive bonding. This is typically at the expense of conventional fastening techniques such as welding, soldering, threaded union, or the like. The continually growing fields of use demand adhesives which in turn are required to satisfy a wide variety of requirements.

DE 195 38 468 A1 discloses a one-component adhesive with a favorable profile of properties. However, its highly reactive UV initiator does not allow an industrially practical open joint time, and its lack of elasticating particles also renders it unsuitable for extensive (i.e., large surface area) bonds.

SUMMARY OF THE INVENTION

The invention relates to a one-component epoxy resin adhesive which is elasticated with silicone rubber and whose open joint time can be adapted to whichever production process it is used in via the nature and concentration of the photoinitiator and/or the duration and/or intensity of UV activation. This adhesive is preferentially suitable for automated adhesive bonding processes and may also be used with advantage for adherents of large surface area having opposite thermal expansion coefficients. It is suitable, for example, for adhesive bonds of permanent magnet materials, such as in the assembly of permanent magnets on metal pole plates and/or solid steel poles in machines with permanent-magnet excitation.

The invention provides an adhesive and a method of adhesive bonding which can be used to realize industrially practical open joint times and extensive bonds.

Furthermore, the use of adhesives which form an elastic adhesive bond is on the increase, especially when the bonded union produced is to be thermally stable over a wide temperature range, since on heat-induced expansion or shrinkage of the workpieces the adhesive bond ought to compensate differences in length by virtue of its elasticity.

The invention provides a one-component adhesive comprising:

A) 5–90% by weight of a cycloaliphatic epoxy resin component,
B) 10–94% by weight of an epoxy-functional silicone rubber,
C) 0.05–5% by weight of a ferrocene-based UV initiator,
D) 0.1–5% by weight of a thermal initiator,
E) 0.05–1.5% by weight of an adhesion promoter,
F) 0.1–10% by weight of a highly disperse silica,
G) 0–3% by weight of spacers, and
H) 0–70% by weight of filler.

The invention further provides a method of two-dimensionally adhesively bonding two workpieces, which comprises:

applying a film of an adhesive to one of the two workpieces or to both workpieces,
setting a desired open joint time of the adhesive by duration-and intensity-specific UV irradiation and/or heat treatment and/or IR irradiation, for the purpose of positional fixing, and
joining the two workpieces,
thermally aftercuring the adhesive.

DETAILED DESCRIPTION OF THE INVENTION

A defined open joint time ensuring secure positioning of the workpieces is made possible by the nature and concentration of the photoinitiator and by the choice of intensity and duration of UV activation.

After the workpieces have been joined, the adhesive, adapted to the manufacturing sequence, may be cured at room temperature until it becomes strong enough to handle, thereby enabling further processing of the resultant assembly without extra mounting-in an automated process, for example.

By briefly heating, such as infrared heating, the open joint time may also be significantly shortened and the handling strength increased as a result. Ultimate strength is then attained in downstream thermal curing.

The open joint time of such an adhesive is easily controlled in accordance with the specific requirement by the concentration of initiator in the adhesive, the duration and/or intensity of UV irradiation, and the temperature of the workpieces, adhesive film and/or surroundings.

The open joint times which can be set vary from a number of seconds to several hours.

Because of the incorporated elastomer particles, the adhesive and the method are also suitable for joining parts of large surface area, including for example solid workpieces having opposite thermal expansion coefficients.

The adhesive preferably comprises a ferrocene-salt-based UV initiator, which brings about an open joint time of between 30 s and 3 h depending on the concentration and on the duration and/or intensity of UV activation. Moreover, it preferably comprises the epoxy-functional silicone rubber in the form of particles, which result in surprisingly high elasticity of the adhesive bond.

For complete curing in circumstances where in some cases no UV light reaches the bond, or where the amount which does reach it is inadequate, such as in the case of thick films and/or shadow regions, for example, the adhesive comprises a thermal initiator.

Constituent A of the adhesive is a cycloaliphatic epoxy resin, e.g., a ring-epoxidized diepoxide such as the cycloaliphatic diglycidyl ether used in an amount of from 5 to 90% by weight, preferably from 5 to 50% by weight.

Component B is an epoxy-functional silicone rubber and is present in the adhesive in an amount of from 10 to 94% by weight, preferably 50–90% by weight, in particular 70–90% by weight. The epoxy-functional groups incorporate the silicone rubber chemically into the polymer matrix. This rules out separation of these particles, which have an average size of 0.1–3 $\mu$m.

Constituent C of the adhesive comprises a ferrocene-salt-based UV initiator which on UV exposure undergoes photolysis and in doing so releases acid cations which catalyze the epoxide polymerization. The reaction rate is dependent on its concentration and on the processing temperature employed. Preference is given to using cyclopentadienylisopropylbenzeneiron(II) hexafluorophosphate.

Constituent D of the adhesive is a thermal initiator based, for example, on a thiolanium salt, such as benzylthiolanium hexafluoroantimonate, and constituent E is a customary adhesion promoter, such as glycidyloxypropyltrimethoxysilane, for example.

The further constituents F, G, and H are a highly disperse silica, such as Aerosil, ceramic or glass beads in order to produce a defined joint gap, and common fillers, such as quartz flour, for example.

Accordingly, the adhesive is curable by the dual principle: the curing reaction is initiated by UV irradiation tailored in its intensity and duration to the desired open joint time. Ultimate strength, including especially in the regions hidden by shadow from the UV light, is achieved with a subsequent thermal curing process.

In one advantageous embodiment of the method, an adhesive bond is produced as follows: one or both of the work-pieces to be joined is or are provided with an adhesive film, preferably in a film thickness of between 10 and 500 $\mu$m. The adhesive film is exposed to UV light for from 1 to 60 s, depending on the open joint time required. At a UV initiator concentration of 0.5% by weight, an intensity of 40 mW/cm$^2$, and an exposure period of from 30 to 60 s, the resulting open joint time (i.e., the period of time within which the adhesive remains liquid) is from 1 to 2 hours.

Within the open joint time, the adherends are joined and aligned in accordance with a template. After the open joint time has expired, the adhesive solidifies and, given the indicated exposure data, reaches practicable handling strength after 3 hours, with a shear strength of 2 N/mm$^2$, which makes it possible to continue handling the assembly without using holding means. In order to give the bonded assembly the maximum strength, a thermal aftercure is performed.

Here, the thermal initiator that is present in the adhesive guarantees full and even curing of the bond site after 2 hours at 150° C.

Where more than two workpieces are to be bonded, further workpieces may be attached and fixed following the fixing of at least one bond site. There is no need for a fixing means for the workpieces which are applied first. Even in the case of bonds on sharply inclined, curved or even overhanging surfaces, fixing by UV irradiation is possible, and after an appropriate open joint time or after the bonded parts have attained a handling strength the relative position of the bonded workpieces remains unchanged even in the course of heating at the curing temperature. The fixing is sufficiently stable and positionally accurate even when additional forces act on the bonded or fixed workpieces. This case is observed, for example, with the adhesive bonding of magnets which, at short distances, exert forces of magnetic attraction and repulsion on one another.

Following thermal aftercuring, the adhesive, and/or the bond site produced with the method using the adhesive, exhibits an ultimate strength of >3.5 N/mm$^2$, measured on a rare-earth permanent magnet material of large surface area, produced by powder metallurgy, namely "VACODYM", in an adhesive bond with iron at 150° C. This level of strength is also maintained after storage at 150° C. for several weeks. An assembly thus produced is suitable for use in the temperature range from −40° C. to 180° C.

The adhesive is applied at room temperature by means of dispenser technology or knife-coating technology in a film thickness of 10–500 $\mu$m, preferably 70–150 $\mu$m, and with particular preference from 100 to 125 $\mu$m, on either one of the workpieces or both workpieces.

In order to set a defined joint gap it has proven advantageous to add spacers such as glass beads, for example. It is especially practical in this case to use glass beads having a diameter corresponding to the target size of the joint gap. For example, by adding glass and/or ceramic beads having a diameter of about 100–125 $\mu$m it is possible to produce an adhesive film thickness and a joint gap having this order of magnitude.

The glass and/or ceramic beads may be incorporated into the adhesive before it is applied to one of the workpieces or may be scattered onto the applied adhesive bed on the workpiece during the open joint time.

The amount of spacers in the adhesive is advantageously from 0.5 to 5% by weight. An amount of from 0.75 to 3, and in particular of about 1% by weight, based on the total adhesive mass, has been found particularly advantageous.

The adhesive bonding method is suitable for joining a large number of very different substrates. One field of use of the invention is, in particular, the adhesive bonding of a permanent magnet element to a ferromagnetic material, such as an iron pole, comprising a solid block or a layered stack of metal plates, in an electrical machine. High bond strength is also achieved, however, on glass, plastic, ceramic, and metal.

In the text below the adhesive is illustrated with reference to a working example (all components are, individually, available commercially):

A) 10.0 g of 3,4-epoxycyclohexylmethyl 3,4-epoxycyclohexanecarboxylate

B) 87.5 g of silicone-elastomer-modified epoxy resin

C) 0.5 g of cyclopentadienylisopropylbenzeneiron(II) hexafluorophosphate

D) 1.5 g of S-benzylthiolanium hexafluoroantimonate

E) 0.5 g of glycidyloxypropyltrimethoxysilane

F) 0.5 g of highly disperse silica

G) 1.0 g of glass beads

H) 12 g of quartz flour

The adhesive bonding method of the invention has the advantage that joints can be implemented continuously without complicated holding means. The parameters for the open joint time, adjustable via the nature of the UV initiator, the concentration of the UV initiator, and the duration and/or intensity of UV activation, are to be chosen so that the setting of the handling strength fits into the desired manufacturing process and the further handling of the workpieces to be bonded can be carried out without additional mounts.

An advantage with the initiator system of the adhesive of the invention is that both the photoinitiator and the thermal initiator trigger a cationic polymerization; i.e., the curing of the adhesive produces a uniform, stress-free network. A further advantage is that thermal curing may be performed independently of the point in time after the UV activation. The ultimate strength obtained is always the same, irrespective of whether there is an open joint time of 1 minute or 3 hours or even a storage period of 3 days.

What is claimed is:

1. An adhesive, comprising:

A) 5–90% by weight of a cycloaliphatic epoxy resin component;

B) 10–94% by weight of epoxy-functional silicone rubber;

C) 0.05–5% by weight of a ferrocene-based UV initiator;

D) 0.1–5% by weight of a thermal initiator;

E) 0.05–1.5% by weight of an adhesion promoter;

F) 0.1–10% by weight of a highly disperse silica;

G) 0–3% by weight of spacers; and

H) 0–70% by weight of filler.

2. The adhesive as claimed in claim 1, wherein the ferrocene-based UV initiator is cyclopentadienylisopropylbenzeneiron(II) hexafluorophosphate.

3. The adhesive as claimed in claim 1, wherein the thermal initiator is benzylthiolanium hexafluoroantimonate.

4. The adhesive as claimed in claim 1, wherein the adhesive adhesively bonds adherends of large surface area having opposite expansion coefficients.

5. A method of two-dimensionally adhesively bonding two workpieces, comprising:

applying a film of an adhesive to at least one of the two workpieces;

setting a desired open joint time of the adhesive by duration and intensity-specific UV irradiation and/or heat treatment and/or IR irradiation, for positional fixing;

joining the two workpieces; and thermally aftercuring the adhesive;

wherein said adhesive comprises:

A) 5–90% by weight of a cycloaliphatic epoxy resin component;

B) 10–94% by weight of epoxy-functional silicone rubber;

C) 0.05–5% by weight of a ferrocene-based UV initiator;

D) 0.1–5% by weight of a thermal initiator;

E) 0.05–1.5% by weight of an adhesion promoter;

F) 0.1–10% by weight of a highly disperse silica;

G) 0–3% by weight of spacers; and

H) 0–70% by weight of filler.

6. The method as claimed in claim 5, wherein at least one additional workpiece is attached to the two workpieces and fixed before thermal curing.

7. The method as claimed in claim 5, in which at least one of the workpieces is solid.

8. An adhesively bonded assembly of at least two workpieces joined by an adhesive, the adhesive comprising:

A) 5–90% by weight of a cycloaliphatic epoxy resin component;

B) 10–94% by weight of epoxy-functional silicone rubber;

C) 0.05–5% by weight of a ferrocene-based UV initiator;

D) 0.1–5% by weight of a thermal initiator;

E) 0.05–1.5% by weight of an adhesion promoter;

F) 0.1–10% by weight of a highly disperse silica;

G) 0–3% by weight of spacers; and

H) 0–70% by weight of filler.

9. The assembly as claimed in claim 8, wherein workpieces comprising a magnetic material are joined to a metallic substrate.

10. The assembly as claimed in claim 8, wherein the assembly operates in the temperature range from about −40° C. to about 180° C.

\* \* \* \* \*